United States Patent
Hayashi

(10) Patent No.: US 7,965,908 B2
(45) Date of Patent: Jun. 21, 2011

(54) IMAGE SEARCHING APPARATUS, IMAGE PRINTING APPARATUS, PRINT ORDERING SYSTEM, OVER-THE-COUNTER PRINTING TERMINAL APPARATUS, IMAGE CAPTURING APPARATUS, IMAGE SEARCHING PROGRAM AND METHOD

(75) Inventor: Junji Hayashi, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 1058 days.

(21) Appl. No.: 11/498,828

(22) Filed: Aug. 4, 2006

(65) Prior Publication Data
US 2007/0053571 A1 Mar. 8, 2007

(30) Foreign Application Priority Data
Aug. 18, 2005 (JP) ................. 2005-237442

(51) Int. Cl.
*G06K 9/60* (2006.01)

(52) U.S. Cl. ......... 382/305; 382/118; 382/115; 382/112

(58) Field of Classification Search .......... 382/115–118, 382/305, 112
See application file for complete search history.

(56) References Cited

U.S. PATENT DOCUMENTS

| 6,526,158 | B1* | 2/2003 | Goldberg ..................... 382/115 |
| 6,819,783 | B2* | 11/2004 | Goldberg et al. ............. 382/115 |
| 7,561,723 | B2* | 7/2009 | Goldberg et al. ............. 382/115 |
| 2005/0055582 | A1* | 3/2005 | Bazakos et al. ............... 713/202 |
| 2005/0129334 | A1* | 6/2005 | Wilder et al. ................ 382/305 |
| 2006/0018542 | A1* | 1/2006 | Shuster ........................ 382/181 |

FOREIGN PATENT DOCUMENTS
JP 2004-70717 A 3/2004
* cited by examiner

*Primary Examiner* — Wesley Tucker
*Assistant Examiner* — Mark Roz
(74) *Attorney, Agent, or Firm* — Birch, Stewart, Kolasch & Birch, LLP.

(57) ABSTRACT

An image searching apparatus comprising:
a readout section which reads out image data in which an image of a subject and identification information capable of uniquely identifying the subject are related;
an input section for inputting identification information indicating a search target subject and an outward characteristic image of the search target subject;
a first extraction section which extracts images to which the identification information is related from the image data read out by the readout section;
and a second extraction section which compares the images extracted by the first extraction section with the outward characteristic image to extract images which include the outward characteristic image.

15 Claims, 12 Drawing Sheets

FIG.6A
INTENSITY INFORMATION

| WIRELESS TAG INFORMATION | RECEPTION INTENSITY |
|---|---|
| INFORMATION 1 | HIGH |
| INFORMATION 2 | MEDIUM |
| INFORMATION 3 | LOW |

FIG.6B
INTENSITY/DISTANCE RELATED INFORMATION

| INTENSITY | DISTANCE (cm) |
|---|---|
| HIGH | 0~50 |
| MEDIUM | 50~100 |
| LOW | 100~∞ |

FIG.6C
MAIN SUBJECT INFORMATION

| POSITION | IC TAG INFORMATION |
|---|---|
| $(X_0, Y_0)$ | INFORMATION 1 |

FIG.6D
DISTANCE INFORMATION

| WIRELESS TAG INFORMATION | DISTANCE (cm) |
|---|---|
| INFORMATION 1 | 0~50 |
| INFORMATION 2 | 50~100 |
| INFORMATION 3 | 100~∞ |

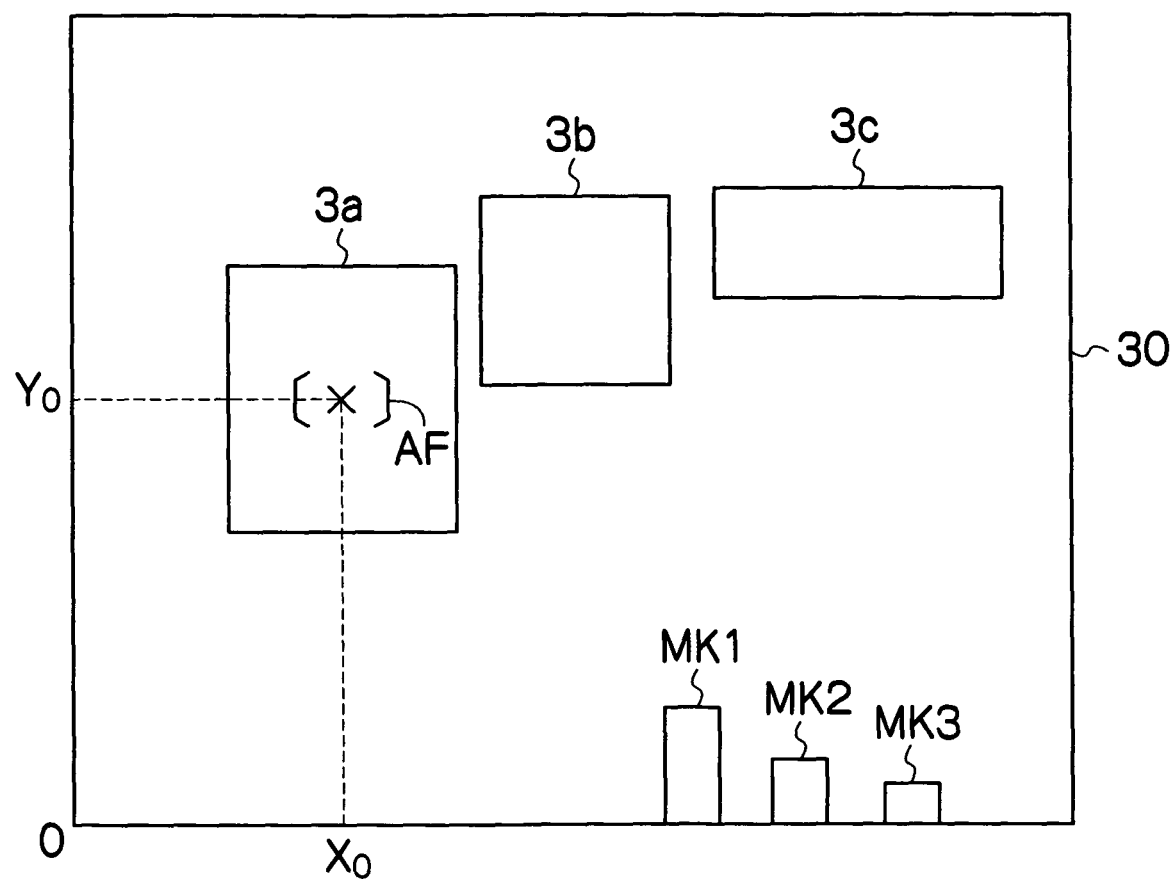

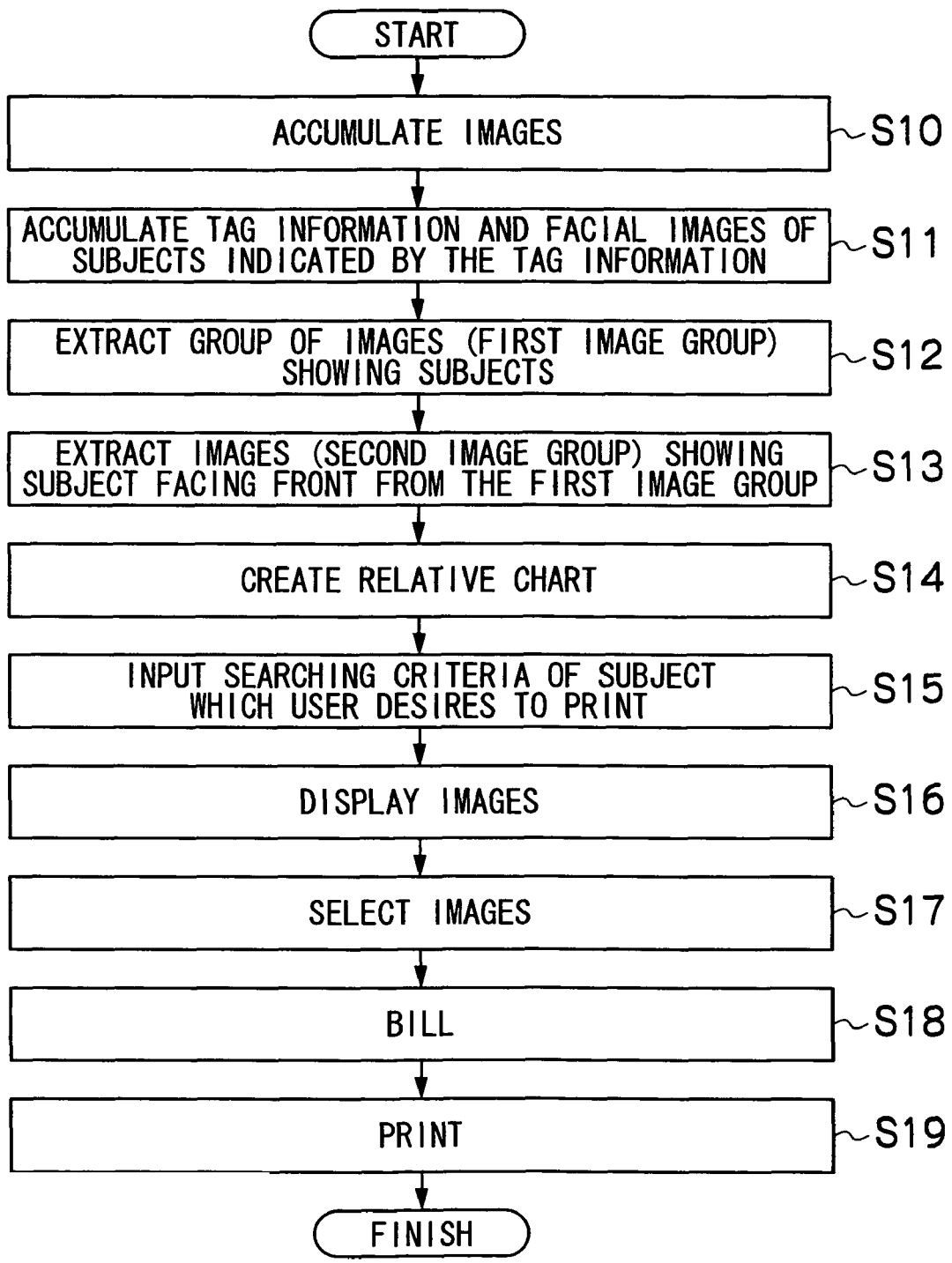

FIG.11

COUPLING CHART OF PHOTOGRAPHED IMAGES AND INDIVIDUALS

|  | TARO YAMADA | ICHIRO AOKI | HANAKO FUJI | X | Y | Z | ... |
|---|---|---|---|---|---|---|---|
| PHOTOGRAPH A | ○ | △ | △ |  |  |  |  |
| PHOTOGRAPH B | △ | △ | ○ |  |  |  |  |
| PHOTOGRAPH C | ○ | ○ |  |  | △ |  |  |
| PHOTOGRAPH D |  | △ |  | ○ |  |  |  |
| PHOTOGRAPH E |  |  |  |  | ○ | △ |  |
| ... |  |  |  |  |  |  |  |

CIRCLES REPRESENT PHOTOGRAPHED IMAGES SHOWING FACES
TRIANGLES REPRESENT PHOTOGRAPHED IMAGES SHOWING FACES THAT ARE UNCLEAR

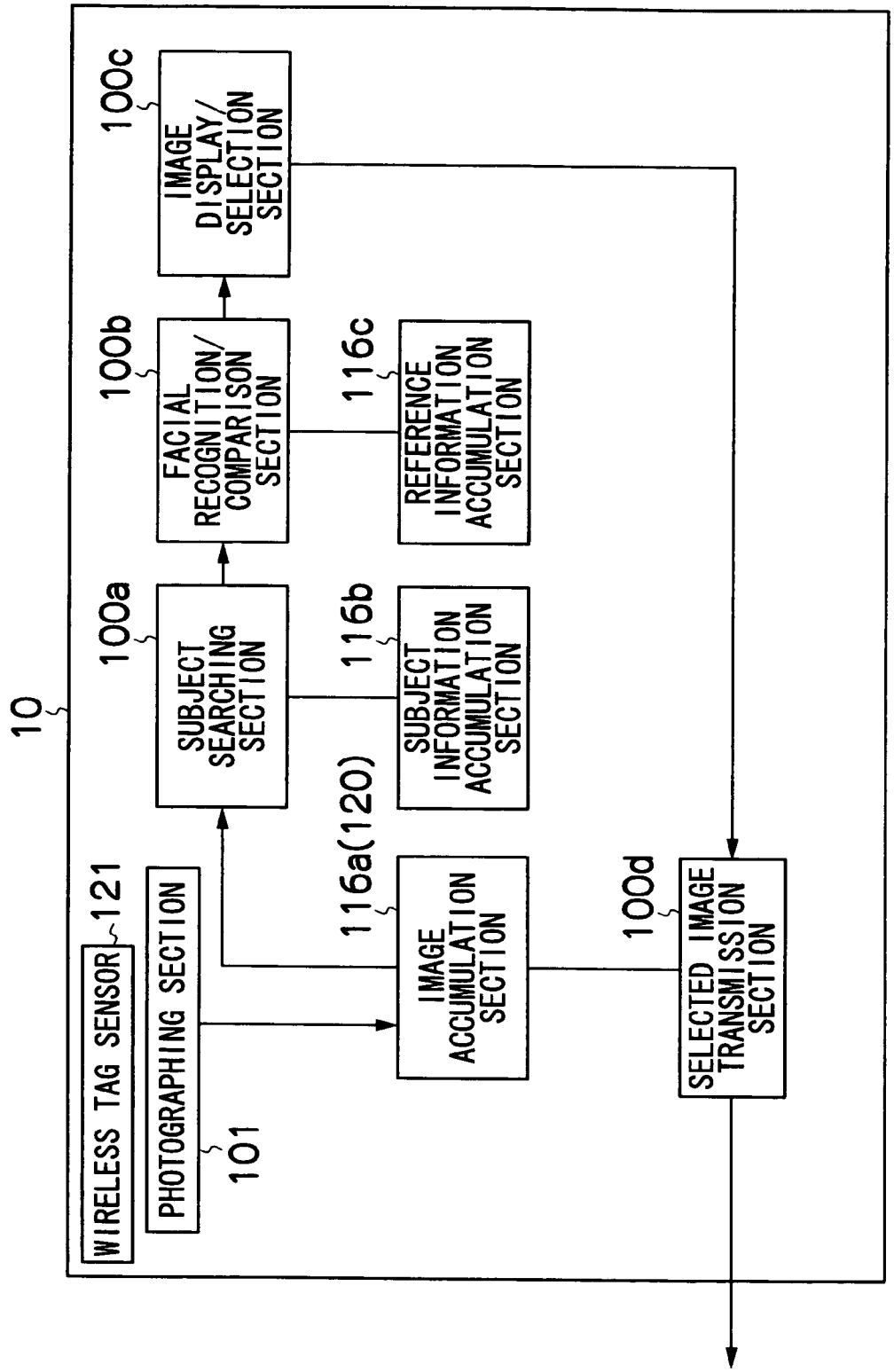

IMAGE SEARCHING APPARATUS, IMAGE PRINTING APPARATUS, PRINT ORDERING SYSTEM, OVER-THE-COUNTER PRINTING TERMINAL APPARATUS, IMAGE CAPTURING APPARATUS, IMAGE SEARCHING PROGRAM AND METHOD

BACKGROUND OF THE INVENTION

1. Field of the Invention

The present invention relates to an image searching apparatus, an image printing apparatus, a print ordering system, an over-the-counter printing terminal apparatus, an image capturing apparatus, and an image searching program and method. In particular, the present invention relates to a technique for capturing a subject and accumulating images to allow a user to extract desired images from the accumulated images.

2. Description of the Related Art

Conventionally, a method used for selling photographs taken at events held at facilities such as kindergartens involved posting a large number of photographs and having participants select those featuring themselves or friends and ordering the selected photographs. As a technique to assist in the task of selecting photographs, Japanese Patent Application Laid-Open No. 2004-70717 discloses a method involving establishing communication with wireless tags attached in advance to subjects in order to measure the positions of the subjects upon taking photographs thereof, wherein the image subjects are identified based on the measured positions and the tag information of the wireless tags.

SUMMARY OF THE INVENTION

However, while the method disclosed in Japanese Patent Application Laid-Open No. 2004-70717 allowed selection of images showing desired subjects from a large number of images, such selection included extracting even unnecessary images such as those where the subjects were facing sideways or backwards and therefore had low photographic values. In addition, in cases where there were numerous subjects in the distance who only appear in the images at extremely small sizes, the method ended up extracting a large number of subjects, thereby forcing a user to handle additional selecting.

The present invention has been made in consideration of the above problem, and its object is to provide a technique for searching from recorded images only those which show subjects at a desired level.

In order to achieve the above object, an image searching apparatus according to the present invention comprises: a readout section which reads out image data in which an image of a subject and identification information capable of uniquely identifying the subject are related; an input section for inputting identification information indicating a search target subject and an outward characteristic image of the search target subject; a first extraction section which extracts images to which the identification information is related from the image data read out by the readout section; and a second extraction section which compares the images extracted by the first extraction section with the outward characteristic image to extract images which include the outward characteristic image.

The "input section" may either be configured so that a device which accepts input of identification information and a device which accepts input of outward characteristic images are combined into a single device, or configured as separate devices.

According to the image searching apparatus, images not merely showing a subject but further showing the subject with predefined outward characteristics may be searched.

In addition, the image data may be image data in which images obtained by photographing the subject attached with a wireless tag storing tag information capable of uniquely identifying the subject by the image capturing apparatus, and the tag information received by the image capturing apparatus from the wireless tag, are related.

This enables subject images to be automatically related to identification information (tag information) and stored just by photographing subjects with the image capturing apparatus.

Furthermore, the second extraction section may comprise: a region extraction section which extracts a region corresponding to the outward characteristic image which is included in the images extracted by the first extraction region; a measurement section which measures the area of the region; and a comparison section which compares the extracted region with the outward characteristic image only when the area of the region equals or exceeds a predetermined threshold.

This enables comparison with outward characteristic images to be performed only when the subject is shown at a predetermined size, thereby reducing the computation amount used by the comparison process while allowing images which show the subject at a predetermined size to be searched.

Furthermore, the second extraction section may comprise: a region extraction section which extracts a region corresponding to the outward characteristic image which is included in the images extracted by the first extraction region; a comparison section which compares the extracted region with the outward characteristic image; and a measurement section which measures the area of the region in the images determined by the comparison section to match the outward characteristic image.

This allows images which show the subject at a predetermined size to be searched.

Moreover, the outward characteristic image may be an image which captures a face of the desired subject or an image which captures the hairstyle or clothes of the subject facing a desired direction.

This allows images which show the subject facing the front to be searched.

In addition, the second extraction section may further comprise: a generation section which generates a relative chart in which extracted images are related to definitions of subjects in that image; and a display section which displays either an image determined by the relative chart to have a predefined definition or a thumbnail image of that image.

In this context, "definition" is an indicator of whether an image is worthy of printing, and is determined from, for instance, the size, orientation, degree of blurring and the like of the shown subject.

This allows visual confirmation of images extracted as images having a predefined definition.

Moreover, the input section accepts input of identification information respectively related to a plurality of subjects who are search targets and outward characteristic images of each subject, and further comprises: a subject selection section which selects a desired subject from the plurality of subjects, and wherein the display section displays either an image of the selected subject or a thumbnail image of that image.

This allows searching of a plurality of subjects, and displaying of an image showing a desired subject from the plurality of subjects.

The image searching apparatus may further comprise an image selection section for selecting a desired image from the images or thumbnail images displayed at the display section.

This allows selection of a desired image from the images showing the desired subject.

Furthermore, an image printing apparatus according to the present invention comprises: a readout section which reads out image data in which an image of a subject and identification information capable of uniquely identifying the subject are related; an input section for inputting identification information indicating a search target subject and an outward characteristic image of the search target subject; a first extraction section which extracts images to which the identification information is related from the image data read out by the readout section; a second extraction section which compares the image extracted by the first extraction section with the outward characteristic image to extract images which include the outward characteristic image; and a printing section which prints the images extracted by the second extraction section.

The above-described "readout section" includes a device for reading out image data from a storage media storing such image data, and a device for performing wired or wireless communication with image capturing apparatuses such as digital cameras or camera-equipped mobile phones to acquire image data.

According to the image printing apparatus, images not merely showing a subject but furthering showing the subject with predefined outward characteristics may be searched.

Moreover, a print ordering system according to the present invention comprises: a readout section which reads out image data in which an image of a subject and identification information capable of uniquely identifying the subject are related; an input section for inputting identification information for identifying a subject which a user desires to print and an outward characteristic image of the subject which the user desires to print; a first extraction section which extracts images to which the identification information inputted through the input section is related from the image data read out by the readout section; a second extraction section which compares the images extracted by the first extraction section with the outward characteristic image to extract an image which includes the outward characteristic image; a display section which displays the image extracted by the second extraction section; and a billing section which calculates the cost of printing the image and performs settlement processing.

This enables images not merely showing a subject but further showing the subject with predefined outward characteristics to be searched and presented to the user. Therefore, when the user selects images for ordering prints, the trouble of selecting images worthy of ordering prints from unnecessary images which are unworthy of ordering prints such as those showing a subject facing backwards or blurred images may be avoided.

The print ordering system may further comprise an image selection section for selecting an image which the user desires to print from the images displayed at the display section, and the billing section may be arranged to calculate the cost of printing the image selected by the image selection section and to perform settlement processing.

This allows selecting only desired images from the displayed images, and printing the selected images.

Furthermore, an over-the-counter printing terminal apparatus according to the present invention comprises: a readout section which reads out image data in which an image of a subject and identification information capable of uniquely identifying the subject are related; an input section for inputting identification information for identifying a subject which a user desires to print and an outward characteristic image of the subject which the user desires to print; a first extraction section which extracts images to which the identification information inputted to the input section is related from the image data read out by the readout section; a second extraction section which compares the images extracted by the first extraction section with the outward characteristic image to extract an image which includes the outward characteristic image; a display section which displays the image extracted by the second extraction section; a billing section which calculates the cost of printing the image and performs settlement processing; and a printing section which performs printing processing of the image.

This enables images not merely showing a subject but further showing the subject with predefined outward characteristics to be searched and presented to the user. Therefore, when the user selects images for ordering prints, the trouble of selecting images worthy of ordering prints from unnecessary images which are unworthy of ordering prints such as those showing a subject facing backwards or blurred images may be avoided. As a result, the occupancy time of the over-the-counter printing terminal apparatus by the user may be shortened, thereby contributing towards reducing the number of over-the-counter printing terminal apparatus to be installed.

Moreover, the over-the-counter printing terminal apparatus may further comprise an image selection section for selecting an image which the user desires to print from the images displayed at the display section, and the billing section may be arranged to calculate the cost of printing the image selected by the image selection section and perform settlement processing, while the printing section may be arranged to perform printing of the selected image.

In addition, an image capturing apparatus according to the present invention comprises: a receiving section which receives wireless signals from a wireless tag attached to a subject; a tag information readout section which reads out from the received wireless signals tag information which is stored in the wireless tag and is information capable of uniquely identifying the subject; an image capturing section which captures the subject; a first storage section which relates tag information read out from the wireless tag to images captured by the image capturing section and stores the related tag information; a first extraction section which extracts images in which desired search target subject is captured based on tag information to which the images are related from the images stored in the first storage section; an acquisition section which acquires outward characteristic images of the desired subject; a second extraction section which compares the images extracted by the first extraction section with the outward characteristic image to extract an image which includes the outward characteristic image; and a display section which displays the image extracted by the second extraction section.

This enables images not merely showing a subject but further showing the subject with predefined outward characteristics to be searched from the images captured by the image capturing apparatus.

Moreover, an image searching program according to the present invention causes a computer to execute: a readout step for reading out image data in which an image of a subject and identification information capable of uniquely identifying the subject are related; an input step for inputting identification information indicating a search target subject and an outward characteristic image of the search target subject; a first extraction step for extracting images to which the identification information inputted in the input step is related from the image data read out in the readout step; and a second extraction step for comparing the images extracted in the first extraction step with the outward characteristic image to extract an image which includes the outward characteristic image.

According to the image searching program, images not merely showing a subject but further showing the subject with predefined outward characteristics may be searched from the images stored in a computer into which the program has been installed.

Furthermore, an image searching method according to the present invention comprises: a readout step for reading out image data in which an image of a subject and identification information capable of uniquely identifying the subject are related; an input step for inputting identification information and an outward characteristic image of the search target subject; a first extraction step for extracting images to which the identification information inputted in the input step is related from the image data read out in the readout step; and a second extraction step for comparing the images extracted in the first extraction step with the outward characteristic image to extract an image which includes the outward characteristic image.

According to the present invention, only images which show a subject at a desired level may be searched from stored images. In addition, the present invention allows only images appropriate for printing to be presented to a user upon ordering prints.

BRIEF DESCRIPTION OF THE DRAWINGS

FIG. 6A is a diagram showing an example of intensity information;

FIG. 6B is a diagram showing an example of intensity/distance related information;

FIG. 6C is a pattern diagram showing an example of main subject information;

FIG. 6D is a diagram showing an example of distance information;

FIG. 7 is a pattern diagram showing an example of main subject position;

FIG. 8 is a flowchart showing a flow of processing of the printing terminal 70;

FIG. 11 is a pattern diagram showing a relative chart generated by the facial recognition/comparison section; and FIG. 12 is a block diagram showing substantial portions of a digital camera 10 according to a second embodiment.

DETAILED DESCRIPTION OF THE PREFERRED EMBODIMENTS

First Embodiment

[System Outline Configuration]

Figure 1:
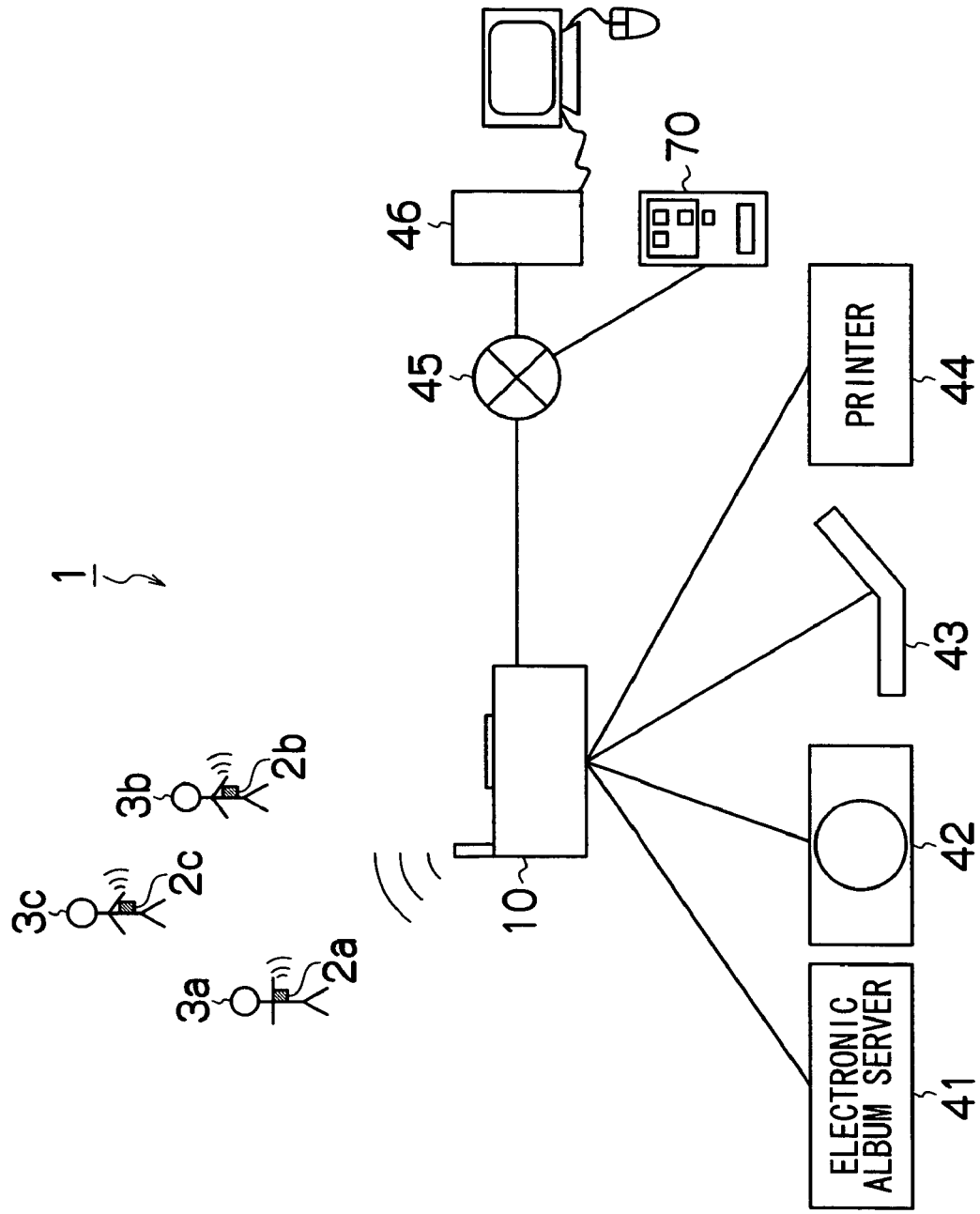
FIG. 1 is a diagram showing an overall configuration of a print ordering system 1 to which the present invention is applied.

FIG. 1 is a diagram showing an overall configuration of a print ordering system 1 to which the present invention is applied.

The print ordering system 1 comprises: one or more wireless tags (as an example, 2a, 2b and 2c in FIG. 1) storing individual information for uniquely identifying one or more subjects (as an example, 3a, 3b and 3c in FIG. 1); a digital camera 10 for capturing the subjects 3a, 3b and 3c to which the ICs 2a, 2b and 2c have been respectively attached; and an over-the-counter printing terminal apparatus (hereinafter referred to as "printing terminal") 70 for printing images captured by the digital camera 10. The printing terminal 70 may either acquire images from the digital camera 10 via a network 45 such as the Internet, or read out images stored in a storage media 120 such as an xD Picture Card (trademark). In addition, the digital camera 10 may order prints by transmitting images to a terminal apparatus 46 operated by a commercial printer providing over-the-counter printing services. Furthermore, the digital camera 10 is capable of outputting captured images to an electronic album server 41, another digital camera 42, a camera-equipped mobile phone 43 and a printer 44 via inter-device connection cables or storage media.

[Camera Outline Configuration]

Figure 2:
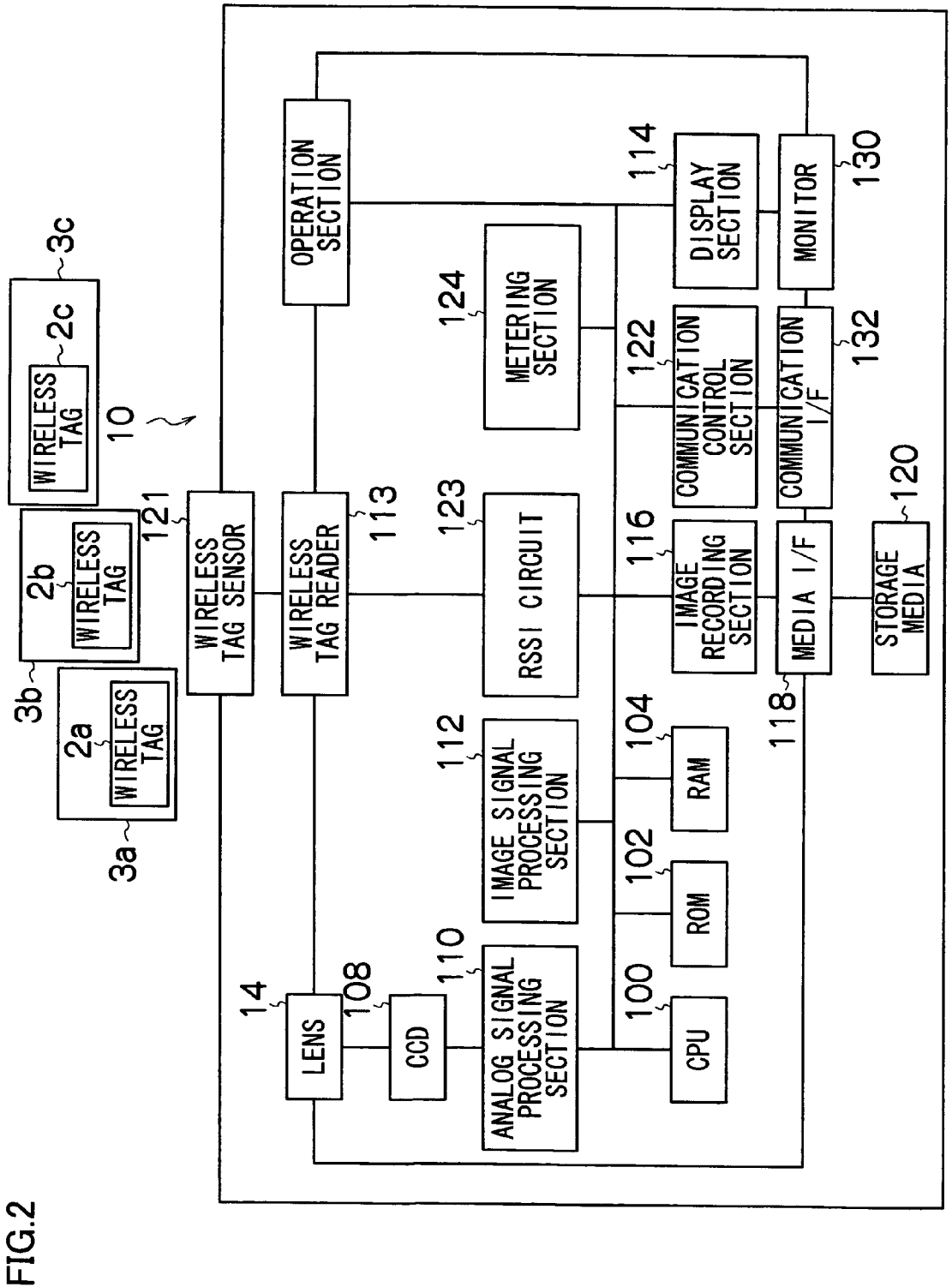
FIG. 2 is a block diagram of an outline internal configuration of a digital camera 10.

FIG. 2 is a block diagram of an outline internal configuration of the digital camera 10 shown in FIG. 1. In FIG. 2, a CPU 100 is a control section comprehensively controls each circuit of the present print ordering system, and comprises storage devices such as a ROM 102 and a RAM 104. The ROM 102 stores control programs processed by the CPU 100 and various data necessary for control, while the RAM 104 is used as a work area by the CPU 100 when performing various processing. The ROM 102 is composed of a Flash ROM capable of deleting/writing data.

Based on operation signals outputted from an operation section 106 comprised of a release button, a power button, a flash button, a macro button, a zoom lever, a display button, a BACK button, a mark button, a MENU/OK button, a cross-shaped button, a mode switch and the like, the CPU 100 controls operation of corresponding circuits in order to control lens drive, photography operation, image processing, recording/playback of image data, and displaying by a monitor 130, and also performs various processing including automatic exposure (AE), automatic focusing (AF) and white balance (WB) adjustment.

Light passing through a lens 14 is incident to a CCD image sensor (CCD) 108. Photosensors are arranged two-dimensionally on an acceptance surface of the CCD 108. An optical image of a subject formed on the acceptance surface of the CCD 108 via the lens 14 is converted by the photosensors into signal charges having quantities corresponding to the incident light volume. The signal charges accumulated in each photosensor are sequentially read out according to drive pulses applied from a timing generator, not shown, as voltage signals (image signals) corresponding to the signal charges and are sent to an analog signal processing section 110.

The analog signal processing section 110 includes signal processing circuits such as a sampling hold circuit, a color separation circuit, a gain adjustment circuit and an A/D converter. Image signals inputted to the analog signal processing section 110 undergo correlated double sampling processing as well as color separation processing into each RGB color signal, and adjustment of the signal levels of each color signal (pre-white balance processing) is performed. The signals are converted into digital image signals before being stored into the RAM 104.

Image signals stored in the RAM 104 are sent to an image signal processing section 112. The image signal processing section 112 is composed of a digital signal processor (DSP) which includes a luminance/color-difference signal generation circuit, a gamma correction circuit, a sharpness correction circuit, a contrast correction circuit, a white balance correction circuit and the like, and processes inputted image signals in accordance with commands from the CPU 100. Image signals inputted into the image signal processing section 112 are converted into luminance signals (Y signals) and color-difference signals (Cr, Cb signals), and is stored in the RAM 104 after receiving predetermined processing such as gamma correction and the like. Image data stored in the RAM 104 are inputted to a display section 114. The display section 114 converts inputted image data into display signals of a predetermined standard (for instance, a color composite picture signal according to the NTSC standard), and outputs the converted signals to the monitor 130.

Image data in the RAM 104 is regularly rewritten by image signals outputted from the CCD 108, and by supplying picture signals generated from the image data to the monitor 130, images inputted via the CCD 108 are displayed in real-time on the monitor 130. The image displayed on the monitor 130 (live view) enables a photographer to verify angles of view of photography.

The display section 114 includes an OSD signal generating circuit. According to commands from the CPU 100, the OSD signal generating circuit generates signals for displaying textual and symbolic information such as shutter speed or aperture value, remaining photograph capacity, date and time of photographing, alarm messages, and automatic focusing frame (AF). As needed, signals outputted from the OSD signal generating circuit are mixed with image signals, and supplied to the monitor 130. This enables displaying of composite images in which texts and the like are composited onto live views or playback images.

When the mode of the camera is set to photography mode by the mode switch, the digital camera 10 becomes capable of performing photography. When the release button is halfway-pressed in this state, a S1ON signal is transmitted to the CPU 100. Upon detection of the S1ON signal, the CPU 100 performs AE and AF operations. In other words, the CPU 100 drives a lens driving section, not shown, so that a subject is brought into focus, and at the same time measures the brightness of the subject to determine an aperture value and shutter speed so that optimum exposure is established.

Then, when the release button is fully-pressed, a S2ON signal is transmitted to the CPU 100. Upon detection of the S2ON signal, the CPU 100 performs recording processing. In other words, the CPU 100 controls a diaphragm driving section, not shown, and the electronic shutter of the CCD 108 so that the aperture value and shutter speed determined upon halfway-pressing of the release button is achieved, and performs loading of images.

Thus, loading of image data for recording is commenced in response to a fully-pressing operation of the release button, and one frame's worth of image signals outputted from the CCD 108 is loaded into the RAM 104 via the analog signal processing section 110. Image signals loaded into the RAM 104 undergo predetermined signal processing at the image signal processing section 112, and are once again stored in the RAM 104 before being sent to an image recording section 116.

The image recording section 116 includes a compression/expansion processing circuit which compresses inputted image data according to a predetermined format such as JPEG in response to a command from the CPU 100. The compressed image data is recorded on to the storage media 120 as an image file of a predetermined format (such as an Exif (Exchangeable image file format) image file) via a media interface (media I/F) 118. The storage media 120 may either be a removable media which is detachable to the camera body such as an xD Picture Card (trademark), a SmartMedia (trademark), a Compact Flash (registered trademark), a magnetic disk, an optic disk, a magnetic optical disk, and a Memory Stick, or a storage media built into the camera body (internal memory).

When playback mode is selected by the mode switch, playback of images recorded onto the storage media 120 may be performed. When the mode switch is set to playback mode, the image data in the image file last recorded onto the storage media 120 is read out. The read out image data undergoes necessary expansion processing at the image recording section 116, and is then outputted to the monitor 130 via the display section 114. This enables browsing of images recorded onto the storage media 120.

Frame advancing of images is performed by the cross-shaped button. When the right key of the cross-shaped button is pressed, the next image file is read out from the storage media 120 and played back/displayed on the monitor 130. In addition, when the left key of the cross-shaped button is pressed, the previous image file is read out from the storage media 120 and played back/displayed on the monitor 130.

Transition of the operation mode of the digital camera 10 to a communication mode is triggered when the digital camera 10 is connected to a host device via USB connection. Communication modes comprise a "PC mode" in which the digital camera 10 is connected to a personal computer (PC) and is recognized as a removable disk (mass storage device) by the PC, and a "direct print mode" in which the digital camera 10 is connected to a printer to have the printer print images recorded on the storage media 120. A communication control section 122 performs transmission and receiving of data according to predetermined command format under a set communication mode.

A wireless tag sensor 121 equipped with an antenna which is directional towards the front of the lens 14 is provided on the camera body of the digital camera 10. The wireless tag sensor 121 receives and detects wireless signals from the wireless tags 2a, 2b and 2c respectively attached to the subjects 3a, 3b and 3c. An electromagnetic shield film or the like may be applied to the side of the wireless tag sensor 121 towards the rear of the lens 14 in order to prevent the wireless tag sensor 121 from receiving wireless signals from wireless tags 2 positioned posterior to the lens 14. An RSSI circuit 123 detects intensities of wireless signals received by the wireless tag sensor 121 and outputs the intensities to the CPU 100. A wireless tag reader 113 reads out information recorded on the wireless tags 2 (hereinafter referred to as "wireless tag information") from the wireless signals received by the wireless tag sensor 121, and outputs the information to the CPU 100. A metering section 124 is a device which measures the distance to a subject in focus, and is, for instance, a device which detects an AF evaluation value (focus evaluation value) indicating sharpness of a subject image based on the high frequency components of signals outputted from the CCD 108 and calculates a distance from the lens position to the subject image when the focal position of the lens is set so that the focus evaluation value is at its maximum value. Alternatively, the metering section 124 may be a triangular metering sensor which emits light towards a subject in focus and receives light reflected off the subject to detect the distance to the subject from the angle formed by an emitting section and a receiving section.

[Printing Terminal]

Figure 3:
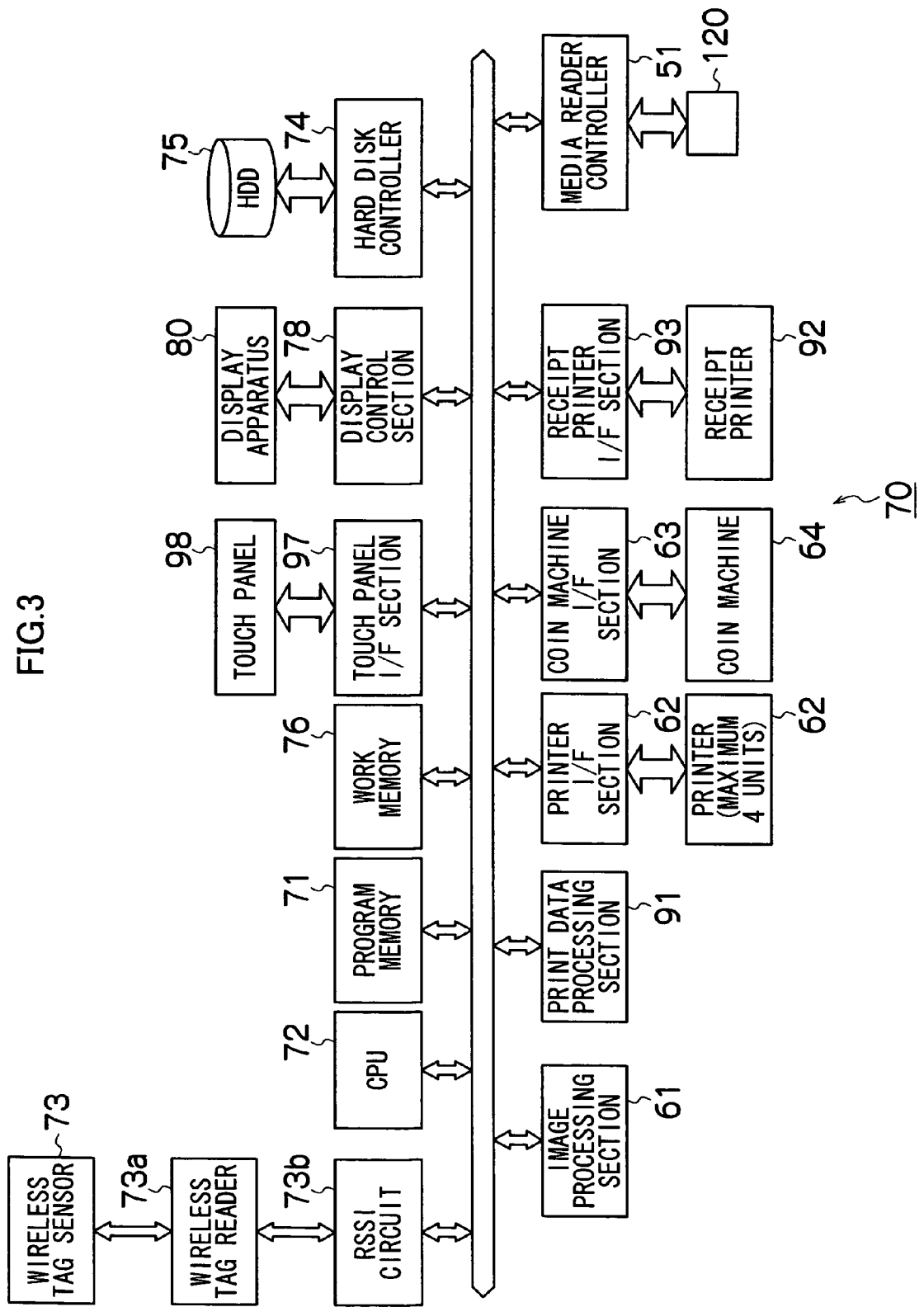
FIG. 3 is a block diagram of an internal configuration of a printing terminal 70.

FIG. 3 is a block diagram of an internal configuration of the printing terminal 70.

When the storage media 120 storing images is inserted, a hard disk controller 74 loads control software stored in a hard disk (HDD) 75 onto a program memory 71. Image data is stored in the storage media 120 in a compressed state according to a predetermined format. After instructing a media reader controller 51 to read out image data, a CPU 72 acquires the required image data from a storage media 50, and expands the image data using the image processing section 61 to restore the original image data. The CPU 72 further performs required image processing at the image processing section 61, and stores the image data into a work memory 76.

A customer inputs various information related to print ordering, such as selection of images to be printed, print quantity and print type through a touch panel 98. Print types which may be specified include digital camera print, split print, sealed print and index print. For split prints, specifiable screen splitting options include 16 split, 4 split, 2 split and no split. Selectable print sizes include card size, L size, CD size and 2L size. In the following description, information related to print ordering inputted through the touch panel 98 will be referred to as order information.

When the customer presses a desired position on the touch panel 98, order information such as print size and print quantity is converted into electric signals corresponding to the pressed position, and the electric signals are inputted to the CPU 72 via a touch panel interface (I/F) section 97.

Inputted information is displayed on a display apparatus 80. The display apparatus 80 is actuated by a display control section 78. A coin machine 64 detects types and quantities of inserted coins to calculate the inserted amount, converts the calculated amount into an electric signal which is then inputted to the CPU 72 via a coin machine I/F section 63. The CPU 72 verifies whether the customer has inserted a necessary amount. If the necessary amount has been inserted, a print data processing section 91 creates print job data from the image data stored in the work memory 76, and sends the print job data to each printer 90 via a print I/F section 62. The above sequence of controls is performed by the CPU 72.

Each printer 90 employs a printing standard referred to as the TA standard, and uses TA Paper which characteristically develops color when heat is applied and is fixed when radiated with light of a predetermined wavelength.

After conclusion of printing, a receipt describing the amount inserted into the coin machine 64 and the returned change or the like is outputted from a receipt printer 92. The CPU 72 instructs contents to be printed by the receipt printer 92 via a receipt printer I/F section 93.

The printing terminal 70 comprises a wireless tag sensor 73, a wireless tag reader 73a and an RSSI circuit 73b. The wireless tag sensor 73, the wireless tag reader 73a and the RSSI circuit 73b are similar to the wireless tag sensor 121, wireless tag reader 113 and RSSI circuit 123 of the above-described digital camera 10.

Figure 4:
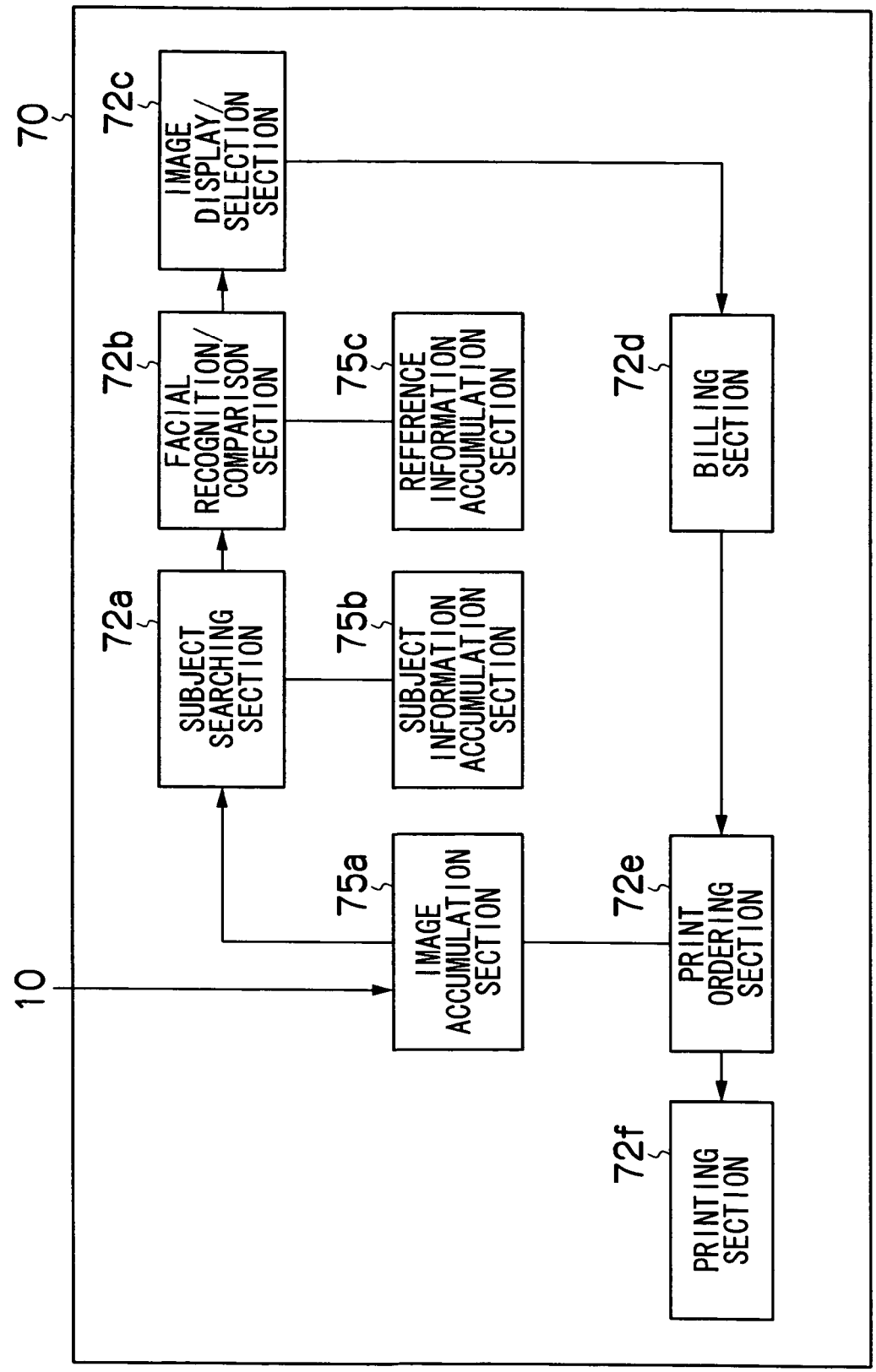
FIG. 4 is a block diagram showing substantial portions of the printing terminal 70.

FIG. 4 is a block diagram showing substantial portions of the printing terminal 70. The printing terminal is mainly composed of an image accumulation section 75a, a subject searching section 72a, a subject information accumulation section 75b, a facial recognition/comparison section 72b, a reference information accumulation section 75c, an image display/selection section 72c, a billing section 72d, a print ordering section 72e and a printing section 72f. Among these components, the image accumulation section 75a, the subject information accumulation section 75b and the reference information accumulation section 75c are provided on the HDD 75. The subject searching section 72a and the facial recognition/comparison section 72b are composed of programs executed by the CPU 72.

The image display/selection section 72c controls image display on the display apparatus 80, and is composed of: a program which accepts operation input from the touch panel 98, the display control section 78, the display apparatus 80, the touch panel interface 97, and the touch panel 98.

The billing section 72d calculates the cost for printing, and is composed of: a program which calculates the amount inserted by a user and performs change processing, the coin machine I/F 63 and the coin machine 64.

The print ordering section 72e reads out an image specified by the user which has been accepted by the image display/selection section 72c from the image accumulation section 75a, and sends printing instructions to the printing section 72f. The print ordering section 72e is composed of: a program which reads out images and issues printing instructions, and the print data processing section 91.

The printing section 72f prints images selected by the user. The printing section 72f is composed of: a program which controls the printer 90 and discharges photographs on which images have been printed, the printer I/F 62 and the printer 90.

The above programs are stored in the HDD 75, and are arbitrarily read out and loaded onto the program memory 71 by the CPU 72 upon execution.

[Processing Performed by the Digital Camera]

Figure 5:
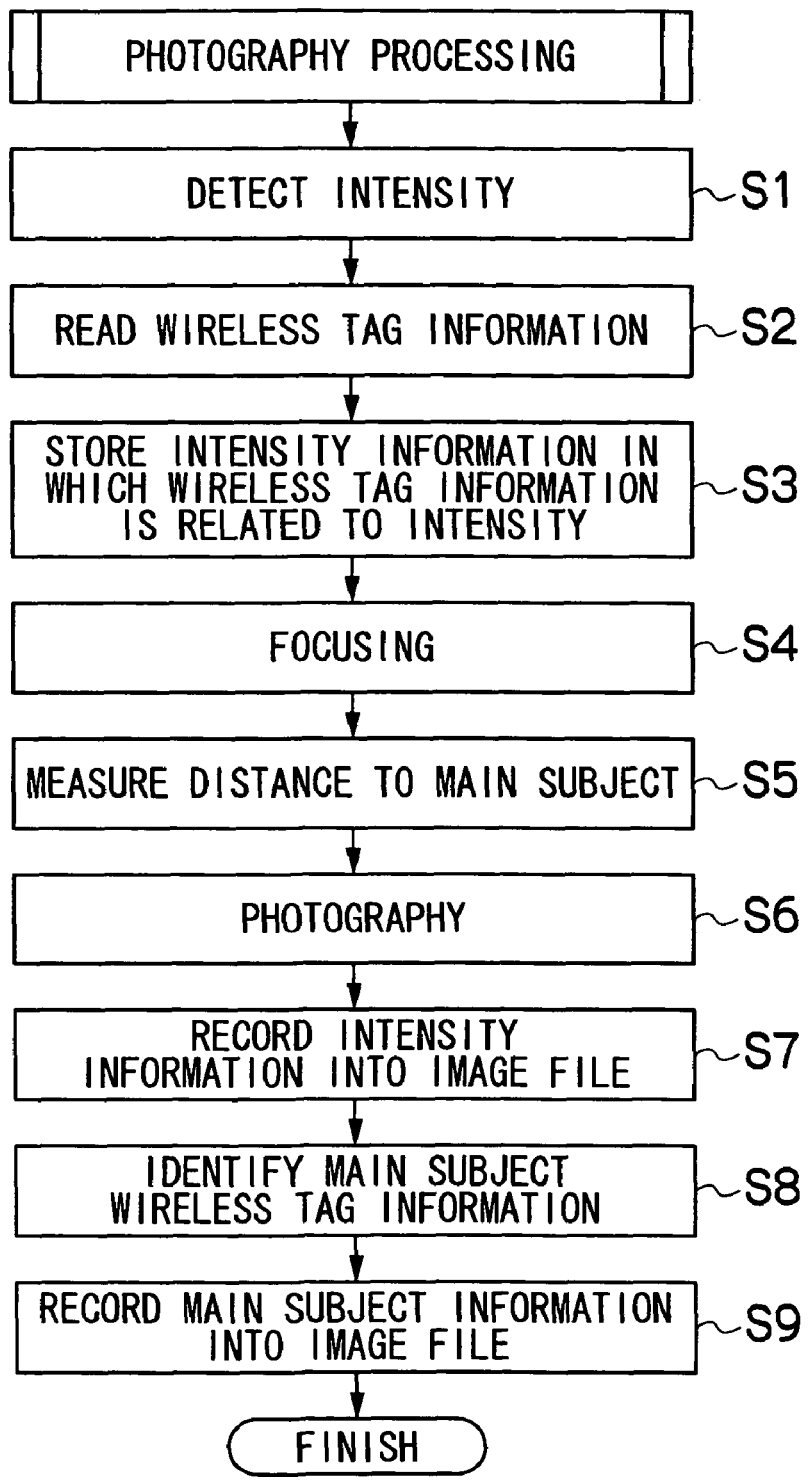
FIG. 5 is a flowchart explaining a flow of photography processing performed by the digital camera 10.

A flow of photography processing performed by the camera 10 will now be described with reference to the flowchart of FIG. 5. The processing involves storing wireless tag information in the wireless tags 2a, 2b and 2c respectively attached to the subjects 3a, 3b and 3c of the digital camera 10 to header portions of image files created by photographing the subjects 3a, 3b and 3c. The processing commences upon detection of the wireless signals of the wireless tags 2a, 2b and 2c by the wireless tag sensor 121.

In step S1, the RSSI circuit 123 detects intensities of wireless signals transmitted by the wireless tag sensors 2a, 2b and 2c and outputs the intensities to the CPU 100. In step S2, the wireless tag sensor 113 reads out wireless tag information from the wireless signals of the wireless tags 2a, 2b and 2c. In step S3, the CPU 100 stores intensity information which relates intensities detected in step S1 to wireless tag information read out from each wireless tag 2a to 2c in step S2 into the RAM 104. FIG. 6A shows an example of intensity information. As shown, intensity information relates information 1 to 3 which are wireless tag information read out from the wireless tags 2a to 2c respectively attached to the three subjects 3a to 3c, to the intensities of the wireless signals from which the information 1 to 3 were read out. In other words, by comparing the distances of the subjects 3a to 3c in the image with the intensities included in the intensity information, correspondence of subjects and wireless tag information may be determined.

In step S4, a halfway-pressing operation of the shutter button of the operation section 106 is detected. In response to the detection thereof, focus lock (lock in focus) is performed on a subject 3a that is at a photographing position enclosed in the automatic focusing frame AF. In the following description, a focus-locked subject 3a may also be referred to as a main subject. FIG. 7 shows a display example of a live view and an automatic focusing frame AF upon focus lock. In FIG. 7, halfway-pressing is performed when the automatic focusing frame AF is positioned on the subject 3a, thereby bringing the subject 3a into focus. The display position of the automatic focusing frame AF on the monitor 130 may be at the center of the monitor 130, or alternatively, may be arranged to be movable to an arbitrary position (for instance, as shown in FIG. 7, to a position which is slightly left of center of the monitor 130) by scrolling the cross-shaped button vertically and/or horizontally. Then, by subsequently halfway-pressing the shutter button, focus lock may be performed on a subject at a photographing position indicated by the moved automatic focusing frame AF. In the following description, the photographing position indicated by the automatic focusing frame AF after focusing will be referred to as a main subject position.

As an example of a main subject position, FIG. 7 indicates a center position (X0, Y0) of the focus-locked automatic focusing frame AF on an xy-plane on the monitor 130, where the bottom left corner of the monitor 130 is the origin O. In other words, positions of the subjects 3b and 3c in focus may be determined from the main subject position. The detection of the wireless tags 2a to 2c, as well as a marker indicating the intensities of the wireless signals transmitted by the detected wireless tags may be displayed on the monitor 130 by the OSD signal generation circuit. In FIG. 7, markers MK1 to MK3 respectively indicating the intensities of the wireless signals transmitted by the three wireless tags 2a to 2c are displayed on the monitor 130.

In step S5, the metering section 124 calculates the distance to a main subject. For instance, as shown in FIG. 7, when the subject 3a is focus-locked, the distance to the subject 3a is calculated. In step S6, loading of image data to be recorded is initiated in response to detection of the shutter button being fully-pressed. Image data to be recorded is recorded in a data portion of an image file in a predetermined format. In step S7, the CPU 100 stores intensity information in the RAM 104 to a header portion of the image file. As an example, in the case of Exif image files which have tags in their header portions, intensity information may be stored in a predetermined tag (for instance, a UserComment tag).

In step S8, the CPU 100 identifies the intensity of a wireless signal corresponding to the distance to the main subject based on intensity/distance related information stored in the ROM 102. FIG. 6B shows an example of intensity/distance related information. Intensity/distance information prescribes correspondence of the distances from the metering section 124 to the wireless tags 2a to 2c to the intensities of the wireless signals transmitted by the wireless tags 2a to 2c. While FIG. 6B shows an example where "high", "medium" and "low" intensities respectively relate to distances of "0-50 cm (greater than or equal to 0 cm and less than 50 cm)", "50-100 cm (greater than or equal to 50 cm and less than 100 cm)" and "100 cm–∞ (greater than or equal to 100 cm)", the method of prescribing correspondence between distance and intensity by the intensity/distance related information is not limited to the above, and a formula or the like in which distance relates to intensity in a proportional relationship may be used. Next, the CPU 100 identifies main subject wireless tag information which is wireless tag information recorded on the wireless tag 2 attached to the main subject by identifying wireless tag information corresponding to the wireless signal intensity identified above from the intensity information thereof. The CPU 100 then stores main subject information in which main subject wireless tag information is related to main subject positions into the header portion of the image file. FIG. 6C shows an example of main subject information. In FIG. 6C, the subject position (X0, Y0) of the subject 3a in focus is related to information 1 read out from the tag 2a attached to the subject 3a (in other words, main subject wireless tag information). The relationship between the position of the subject 3a in focus in the image and the wireless tag information of the subject 3a may be determined by comparing the main subject information with the image.

[Processing Performed by the Printing Terminal]

A flow of searching and printing processing performed by the printing terminal 70 will now be described with reference to the flowchart of FIG. 8. The processing commences when the storage media 120, which records image data in which wireless tag information in the wireless tags 2a to 2c respectively attached to the subjects 3a to 3c of the digital camera 10 are related to images of the subjects, is inserted into a media slot of the printing terminal 70.

In step S10, the printing terminal 70 accumulates images captured by the digital camera 10 into the image accumulation section 75a.

In step S11, tag information is related to facial images of subjects indicated by the tag information, and stored in the printing terminal 70 (step S111). The user instructs the wireless tag reader 73 of the printing terminal 70 to read tag information of the wireless tags 2a to 2c respectively attached to the subjects 3a to 3c which the user desires to print. Furthermore, facial images of the subjects 3a to 3c are read out from the storage media 120. Tag information of the wireless tags 2a to 2c are related to the facial images of the subjects 3a to 3c and accumulated in the subject information accumulation section 75b and the reference information accumulation section 75c. Tag information and facial images may also be configured as a database to be stored in the image accumulation section 75a.

In step S12, the subject searching section 72a reads out tag information which indicate the subject from the subject information accumulation section 75b, and extracts images related to the tag information from the group of images accumulated in the image accumulation section 75a (step S12). In the following description, the group of images extracted in step S12 will be referred to as the first image group.

In step S13, the facial recognition/comparison section 72b extracts a group of images which show the subject's face facing the front and at a predefined size from the first image group (step S13). The facial recognition/comparison section 72b is composed of: a region extraction section which extracts search target regions from images, a measurement section which measures areas of extracted regions, and a comparison section. The region extraction section performs facial region detection processing on the images of the first image group. Skin color detection processing may be used for detecting facial regions. Next, the measurement section measures the numbers of pixels of the skin-colored regions. The measurement section hands over facial region images with numbers of pixels equal to or greater than a predetermined threshold to the comparison section. The comparison section reads out a facial image of the desired subject from the reference information accumulation section 75c, compares facial regions extracted from individual images included in the first image group with the facial image of the subject, and extracts images which include the facial image of the subject. In the following description, the group of images extracted in step S14 will be referred to as the second image group.

The processing of step S13 will now be described with reference to FIGS. 9 and 10. A photographed image A in FIG. 9 and a photographed image B in FIG. 10 are both photographed images belonging to the first image group in a case where "Taro Yamada", "Ichiro Aoki" and "Hanako Fuji" have been specified as targets. The photographed images A and B both show the three subjects of: "Taro Yamada, Red team, age 5", "Ichiro Aoki, Green team, age 4", and "Hanako Fuji, Yellow team, age 6". All images showing all three subjects, regardless of the sizes and orientations of their facial regions, have been extracted to form the first image group.

Figure 9:
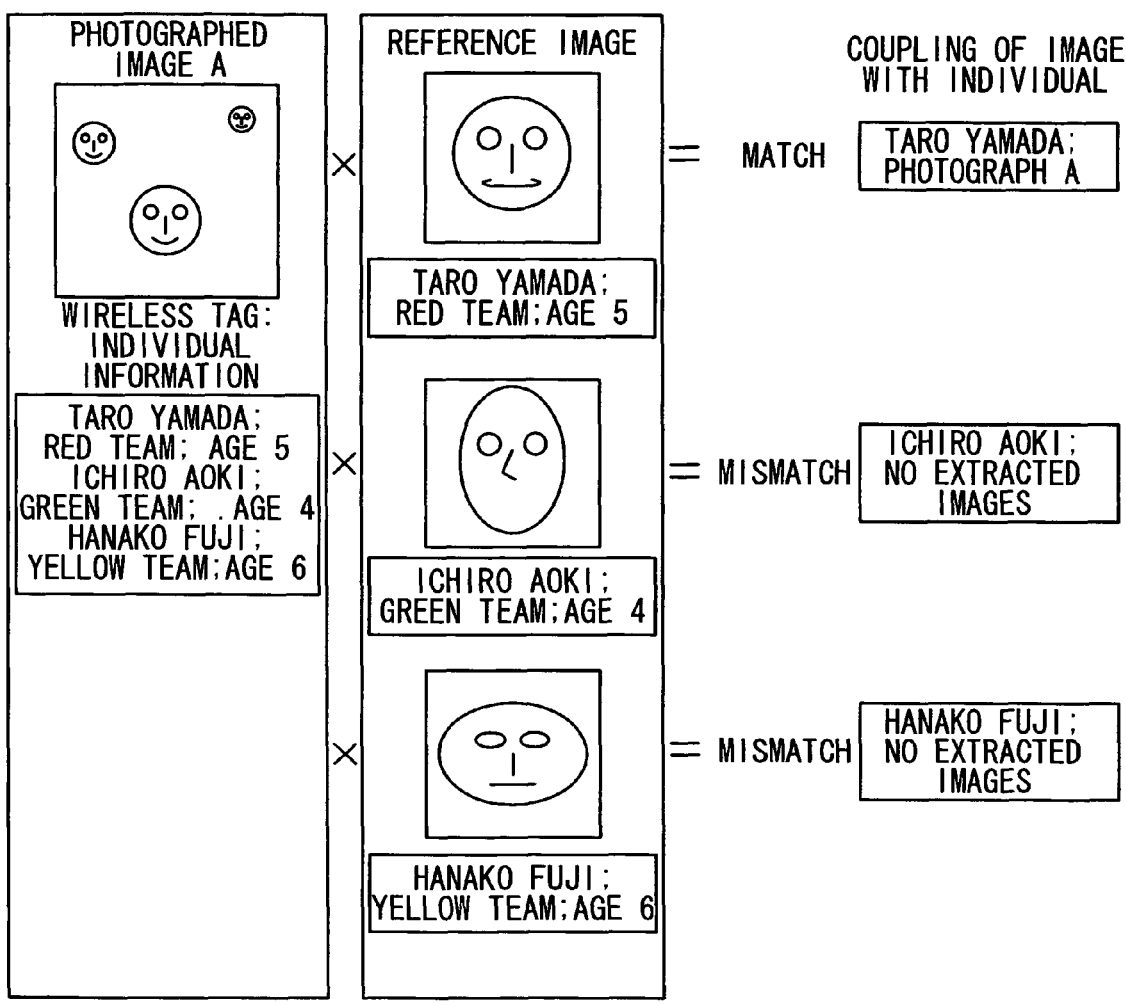
FIG. 9 is a pattern diagram showing processing of a facial recognition/comparison section.
Figure 10:
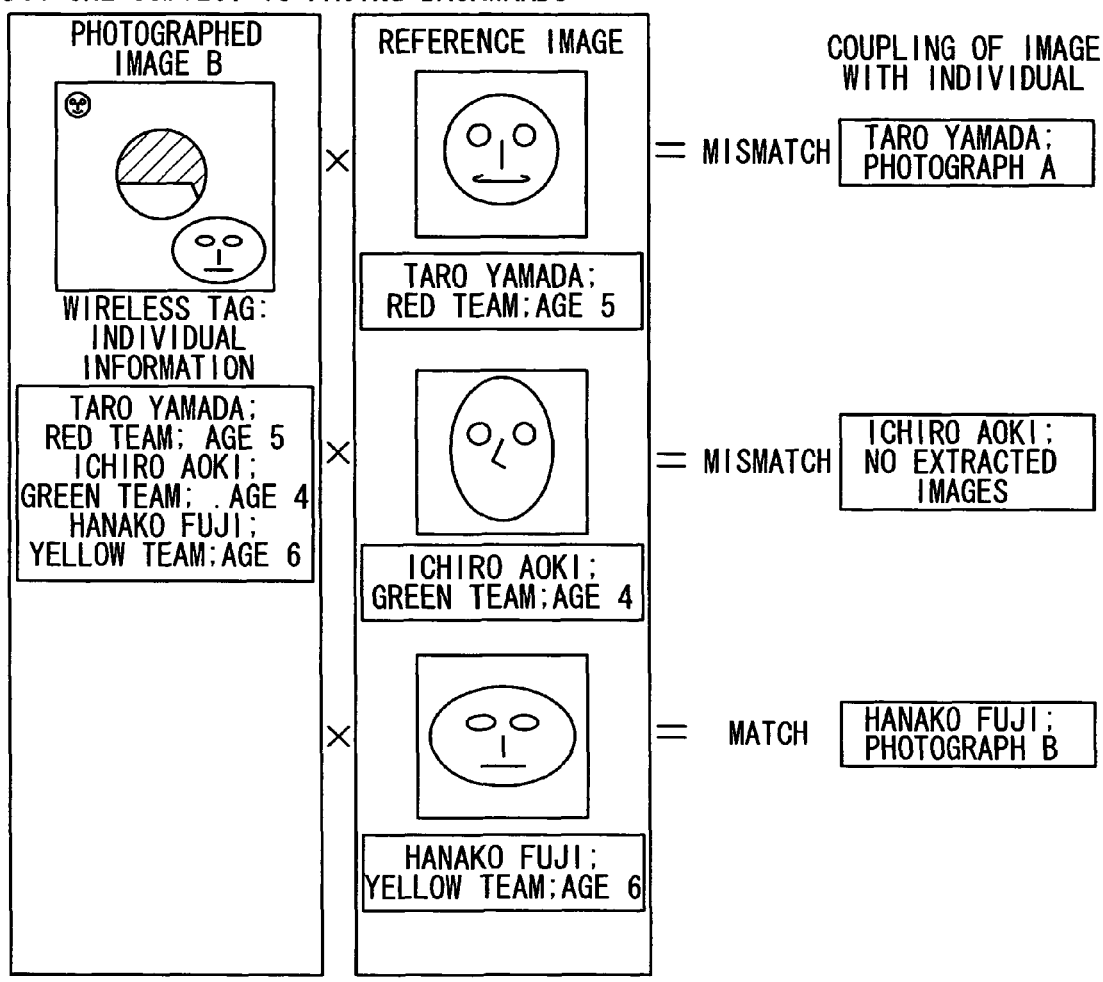
FIG. 10 is a pattern diagram showing processing of the facial recognition/comparison section.

However, while the photographed image A of FIG. 9 shows all three subjects facing the front, only Taro Yamada is shown at the predetermined size, and Ichiro Aoki and Hanako Fuji are shown at sizes smaller than the predetermined size. In this case, the facial recognition/comparison section 72b compares the photographed image A with reference images (facial images of Taro Yamada, Ichiro Aoki and Hanako Fuji), and determines "Taro Yamada" to be a "match" and "Ichiro Aoki" and "Hanako Fuji" to be "mismatches". As a result, the photographed image A will be included in a second image group when "Taro Yamada" is specified, and the photographed image A will not be included in a second image group when either "Ichiro Aoki" or "Hanako Fuji" is specified. In FIG. 10, "Ichiro Aoki" and "Hanako Fuji" are facing the front, while "Taro Yamada" is facing backwards. In this case, the facial recognition/comparison section 72b determines "Taro Yamada" to be a "mismatch" since "Taro Yamada" is facing backwards, determines "Ichiro Aoki" to be a "mismatch" since "Ichiro Aoki" is smaller than the predetermined size, and determines "Hanako Fuji" to be a "match".

In step S14, the facial recognition/comparison section 72b creates a relative chart indicating whether each image shows faces of subjects based on identification results (step S14). FIG. 11 is a pattern diagram showing an example of a relative chart. In the relative chart, photographed images showing faces are indicated by circles, while photographed images showing subjects but not clearly showing faces are indicated by triangles. For example, in step S14, since only "Taro Yamada" was determined to be a "match" and "Ichiro Aoki" and "Hanako Fuji" were both determined to be "mismatches" for the photographed image A, a circle will be inputted for "Taro Yamada" and triangles will be inputted for "Ichiro Aoki" and "Hanako Fuji" in regards to the photographed image A.

In step S15, the user inputs search criteria for the subject which the user desires to print (step S15). In order to select a subject which the user desires to print from the three subjects 3a to 3c inputted in step S11, the user inputs criteria for specifying the subject which he/she desires to print, such as the name of the subject, through the touch panel 98. Alternatively, the image display/selection section 72c may display facial images loaded in step S11 on the display apparatus 80 to allow selection by the user.

In step S16, the image display/selection section 72c references the relative chart, and displays either an image or a thumbnail image of the subject corresponding to the searching criteria inputted in step S15 on the display apparatus 80 (step S16). After referencing the relative chart, when there are only a small number (for instance, three or less) of images showing the face of the images, or in other words, images marked with circles in the relative chart, images marked with triangles which show the subject may also be displayed.

In step S17, the user selects images which he/she desires to print through the touch panel 98 (step S17).

In step S18, the billing section 72d calculates the printing cost based on the number of images selected by the user, and performs billing processing.

In step S19, the print ordering section 72e reads out images selected by the user from the image accumulation section 75a, and the printing section 72f performs image printing processing according to instructions from the print ordering section 72e.

According to the present embodiment, when the user selects images which he/she desires to print with the printing terminal 70, only the images which show the desired subject facing front as well as at an appropriate size will be displayed on the display apparatus 80, thereby simplifying image selection. In addition, by shortening the time required for image selection by the user at the printing terminal 70, the number of printing terminals to be installed may be reduced.

In the present embodiment, while a relative chart was created in step S14, the processing of creating the relative chart may be omitted by storing only the comparison results of step S13 and referencing the comparison results in step S16. Furthermore, in the present embodiment, while searching criteria for identifying the subject which the user desires to print was inputted in step S15, step S15 may be omitted in a case where only tag information and an outward characteristic image of a single subject, for instance 3a, is loaded in step S111.

Moreover, in the present embodiment, while facial images have been used to determine whether a desired subject is facing front, the orientation or size of a subject may be determined based on the hairstyle of a subject facing front or a pattern created by the clothes worn by a subject facing front.

Second Embodiment

In the second embodiment, searching of photographed images is performed by a digital camera 10. The digital camera 10 according to the present embodiment is capable of searching images which show a desired subject at a desired size and orientation from captured images.

FIG. 12 is a block diagram showing substantial portions of the digital camera 10. The digital camera 10 is mainly composed of a wireless tag sensor 121, a photographing section 101, an image accumulation section 116a, a subject searching section 100a, a subject information accumulation section 116b, a facial recognition/comparison section 100b, a reference information accumulation section 116c, an image display/selection section 100c, and a selected image transmission section 100d. Among the above components, the photographing section 101 is composed of a lens 14, a CCD 108 and an analog signal processing section 110.

The image accumulation section 116a, the subject information accumulation section 116b and the reference information accumulation section 116c are provided on an image recording section 116 and a storage media 120. The subject searching section 100a and the facial recognition/comparison section 100b are composed of programs executed by a CPU 100.

The selected image transmission section 100d is a component for transmitting images to other apparatus including an electronic album server 41, another digital camera 42, a camera-equipped mobile phone 43 and a printer 44 via inter-device connection cables or storage media. When transmitting images via inter-device connection, wired or wireless connection, a communication I/F 132 such as a USB connector or a wireless transmission/receiving section corresponds to this component. In addition, when transmitting images by recording the images on the storage media 120, a media I/F 118 and the storage media 120 corresponds to this component. The image accumulation section 116a, the subject searching section 100a, the subject information accumulation section 116b, the facial recognition/comparison section 100b, the reference information accumulation section 116c, and the image display/selection section 100c performs the same processing as in the first embodiment.

According to the present embodiment, only the images which show a desired subject at a desired orientation and size may be searched from the images captured by the digital camera 10.

Other Embodiments

By installing a program composing the above-described subject searching section 72a, the facial recognition/comparison section 72b and the image display/selection section 72c into a user's home personal computer, an electronic album server 41 or a camera-equipped mobile phone 43, images which show a desired subject at a desired size and orientation may be searched. In addition, prints may be ordered by sending searched images from the home personal computer to a terminal apparatus 46 of a commercial printer via the Internet. Furthermore, the present invention may be applied to a home-use printing apparatus. In this case, the printing apparatus may be connected via wired or wireless connection to a digital camera 10 or the camera-equipped mobile phone 43 to allow searching of photographs from images acquired from the digital camera 10 or the camera-equipped mobile phone 43 and printing of the photographs with the printing apparatus.

What is claimed is:

1. An image searching apparatus comprising:
    a readout section which reads out image data in which an image of a subject and identification information capable of uniquely identifying the subject are related;
    an input section for inputting identification information indicating a search target subject and an outward characteristic image of the search target subject;
    a first extraction section which extracts images to which the identification information is related from the image data read out by the readout section;
    a second extraction section which compares the images extracted by the first extraction section with the outward characteristic image to extract images which include the outward characteristic image, wherein the second extraction section further comprises a generation section which generates a relative chart, said relative chart indicating for each subject in the extracted image whether or not the image of the subject meets a predefined definition indicating whether an image is worthy of printing, and is determined from the size, orientation, and degree of blurring of the shown subject; and
    a display section which displays either an image determined by the relative chart to have a predefined definition or a thumbnail of that image.

2. The image searching apparatus according to claim 1, wherein the image data is image data in which images obtained by photographing the subject attached with a wireless tag storing tag information capable of uniquely identifying the subject by the image capturing apparatus, and the tag information received by the image capturing apparatus from the wireless tag, are related.

3. The image searching apparatus according to claim 1, wherein the second extraction section comprises:
    a region extraction section which extracts a region corresponding to the outward characteristic image which is included in the images extracted by the first extraction region;
    a measurement section which measures the area of the region; and
    a comparison section which compares the extracted region with the outward characteristic image only when the area of the region equals or exceeds a predetermined threshold.

4. The image searching apparatus according to claim 1, wherein the second extraction section comprises:
    a region extraction section which extracts a region corresponding to the outward characteristic image which is included in the images extracted by the first extraction region;
    a comparison section which compares the extracted region with the outward characteristic image; and
    a measurement section which measures the area of the region in the images determined by the comparison section to match the outward characteristic image.

5. The image searching apparatus according to claim 1, wherein the outward characteristic image is an image which captures a face of the desired subject or an image which captures the hairstyle or clothes of the subject facing a desired direction.

6. The image searching apparatus according to claim 1, wherein the input section accepts input of identification information respectively related to a plurality of subjects who are search targets and outward characteristic images of each subject, and further comprises:
    a subject selection section which selects a desired subject from the plurality of subjects, and
    wherein the display section displays either an image of the selected subject or a thumbnail image of that image.

7. The image searching apparatus according to claim 1, further comprising: an image selection section for selecting a desired image from the images or thumbnail images displayed at the display section.

8. An image printing apparatus comprising:
    a readout section which reads out image data in which an image of a subject and identification information capable of uniquely identifying the subject are related;
    an input section for inputting identification information indicating a search target subject and an outward characteristic image of the search target subject;
    a first extraction section which extracts images to which the identification information is related from the image data read out by the readout section;
    a second extraction section which compares the images extracted by the first extraction section with the outward characteristic image to extract images which include the outward characteristic image, wherein the second extraction section further comprises a generation section which generates a relative chart, said relative chart indicating for each subject in the extracted image whether or not the image of the subject meets a predefine definition indicating whether an image is worthy of printing, and is determined from the size, orientation, and degree of blurring of the shown subject; and
    a printing section which prints the images extracted by the second extraction section.

9. A print ordering system comprising:
    a readout section which reads out image data in which an image of a subject and identification information capable of uniquely identifying the subject are related;
    an input section for inputting identification information for identifying a subject which a user desires to print and an outward characteristic image of the subject which the user desires to print;

a first extraction section which extracts images to which the identification information inputted from the input section is related from the image data read out by the readout section;

a second extraction section which compares the images extracted by the first extraction section with the outward characteristic image to extract an image which includes the outward characteristic image, wherein the second extraction section further comprises a generation section which generates a relative chart subjects in that image, said relative chart indicating for each subject in the extracted image whether or not the image of the subject meets a predefined definition indicating whether an image is worthy of printing, and is determined from the size, orientation, and degree of blurring of the shown subject;

a display section which displays the image extracted by the second extraction section; and a billing section which calculates the cost of printing the image and performs settlement processing.

10. The print ordering system according to claim 9, further comprising: an image selection section for selecting an image which the user desires to print from the images displayed at the display section, wherein the billing section calculates the cost of printing the image selected by the image selection section and performs settlement processing.

11. An over-the-counter printing terminal apparatus comprising:

a readout section which reads out image data in which an image of a subject and identification information capable of uniquely identifying the subject are related;

an input section for inputting identification information for identifying a subject which a user desires to print and an outward characteristic image of the subject which the user desires to print;

a first extraction section which extracts images to which the identification information inputted to the input section is related from the image data read out by the readout section;

a second extraction section which compares the images extracted by the first extraction section with the outward characteristic image to extract an image which includes the outward characteristic image, wherein the second extraction section further comprises a generation section which generates a relative chart, said relative chart indicating for each subject in the extracted image whether or not the image of the subject meets a predefined definition indicating whether an image is worthy of printing, and is determined from the size, orientation, and degree of blurring of the shown subject;

a display section which displays the image extracted by the second extraction section;

a billing section which calculates the cost of printing the image and performs settlement processing; and a printing section which performs printing processing of the image.

12. The over-the-counter printing terminal apparatus according to claim 11, further comprising:

an image selection section for selecting an image which the user desires to print from the images displayed at the display section, wherein:

the billing section calculates the cost of printing the image selected by the image selection section and performs settlement processing; and the printing section performs printing of the selected image.

13. An image capturing apparatus comprising:

a receiving section which receives wireless signals from a wireless tag attached to a subject;

a tag information readout section which reads out from received wireless signals tag information which is stored in the wireless tag and is information capable of uniquely identifying the subject;

an image capturing section which captures the subject;

a first storage section which relates tag information read out from the wireless tag to images captured by the image capturing section and stores the related tag information;

a first extraction section which extracts images in which desired search target subject is captured based on tag information to which the images are related from the images stored in the first storage section;

an acquisition section which acquires outward characteristic images of the desired subject;

a second extraction section which compares the images extracted by the first extraction section with the outward characteristic image to extract an image which includes the outward characteristic image, wherein the second extraction section further comprises a generation section which generates a relative chart, said relative chart indicating for each subject in the extracted image whether or not the image of the subject meets a predefined definition indicating whether an image is worthy of printing, and is determined from the size, orientation, and degree of blurring of the shown subject; and a display section which displays the image extracted by the second extraction section.

14. A computer-readable medium including an image searching program which causes a computer to execute:

a readout step for reading out image data in which an image of a subject and identification information capable of uniquely identifying the subject are related;

an input step for inputting identification information indicating a search target subject and an outward characteristic image of the search target subject;

a first extraction step for extracting images to which the identification information inputted in the input step is related from the image data read out in the readout step;

a second extraction step for comparing the images extracted in the first extraction step with the outward characteristic image to extract an image which includes the outward characteristic image, wherein the second extraction step further comprises a generation step which generates a relative chart, said relative chart indicating for each subject in the extracted image whether or not the image of the subject meets a predefined definition indicating whether an image is worthy of printing, and is determined from the size, orientation, and degree of blurring of the shown subject; and a display section which displays either an image determined by the relative chart to have a predefined definition or a thumbnail of that image.

15. An image searching method carried out by an image printing apparatus having a readout section, an input section, a first extraction section and a second extraction section comprising the steps of:

a readout step executed by the readout section for reading out image data in which an image of a subject and identification information capable of uniquely identifying the subject are related;

an input step executed by the input section for inputting identification information and an outward characteristic image of the search target subject;

a first extraction step executed by the first extraction section for extracting images to which the identification information inputted in the input step is related from the image data read out in the readout step; and a second extraction step executed by the second extraction section for comparing the images extracted in the first extraction step with the outward characteristic image to extract an image which includes the outward characteristic image, wherein the second extraction step further comprises a generation step which generates a relative chart, said relative chart indicating for each subject in the extracted image whether or not the image of the subject meets a predefined definition indicating whether an image is worthy of printing, and is determined from the size, orientation, and degree of blurring of the shown subject.

* * * * *